(12) United States Patent
Vetter et al.

(10) Patent No.: US 6,310,318 B1
(45) Date of Patent: Oct. 30, 2001

(54) SYSTEM FOR CUTTING GLASS TUBE INTO TUBE SECTIONS

(75) Inventors: Helmut Vetter, Ravensburg; Joachim Glocker, Weingarten; Oliver Rustemeier, Munich; Günter Kavallar, Aulendorf, all of (DE)

(73) Assignee: Arzneimittel GmbH Apotheker Vetter & Co., Ravensburg (DE)

( * ) Notice: Subject to any disclaimer, the term of this patent is extended or adjusted under 35 U.S.C. 154(b) by 0 days.

(21) Appl. No.: 09/499,239

(22) Filed: Feb. 7, 2000

(30) Foreign Application Priority Data

Feb. 6, 1999 (DE) .............................................. 199 04 978

(51) Int. Cl.[7] ........................... B23K 26/14; B23K 26/16; B23K 26/00
(52) U.S. Cl. ............................... 219/121.67; 219/121.72; 225/2
(58) Field of Search ........................ 219/121.67, 121.72; 225/2

(56) References Cited

U.S. PATENT DOCUMENTS

| | | | | |
|---|---|---|---|---|
| 3,744,690 | * | 7/1973 | Gray et al. ................................. | 225/2 |
| 3,770,173 | * | 11/1973 | Carothers et al. ........................ | 225/2 |
| 4,044,936 | * | 8/1977 | Obersby et al. ........................... | 225/2 |
| 4,225,070 | * | 9/1980 | Dahlberg et al. ......................... | 225/2 |
| 4,248,369 | * | 2/1981 | Clausen ..................................... | 225/2 |
| 4,351,459 | * | 9/1982 | Huey-Miin ............................ | 225/96.5 |
| 4,467,168 | * | 8/1984 | Morgan et al. ................ | 219/121 LG |
| 4,682,003 | * | 7/1987 | Minakawa et al. ........... | 219/121 LN |
| 5,141,428 | * | 8/1992 | Boukal et al. ......................... | 425/289 |
| 5,475,196 | * | 12/1995 | Lisec ............................... | 219/121.39 |
| 5,902,368 | * | 5/1999 | Witzmann et al. ..................... | 65/105 |
| 5,942,132 | * | 8/1999 | Toyooka et al. ..................... | 219/61.2 |
| 6,087,624 | * | 7/2000 | Brown .............................. | 219/121.72 |

FOREIGN PATENT DOCUMENTS

| | | | | |
|---|---|---|---|---|
| 2234202-A | * | 1/1991 | (GB) ..................................... | 29/33 T |
| 11-156576-A | * | 6/1999 | (JP) ...................................... | 29/33 T |

* cited by examiner

*Primary Examiner*—Tom Dunn
*Assistant Examiner*—Lynne Edmondson
(74) *Attorney, Agent, or Firm*—Herbert Dubno; Andrew Wilford

(57) ABSTRACT

Glass tubes are fed one at a time from a supply to a station. Each of the tubes is rotated in the station about a longitudinal axis of the tube in the station and is simultaneously pressed axially against a fixed stop. A laser beam is directed at the rotating tube in the station at a location along the tube offset from the stop to melt the tube at the location and cut from the tube a section lying between the location and the stop. After cutting from the tube, the tube section is transversely displaced onto a conveyor and transported away from the station by the conveyor. Then the tube in the station is advanced axially into engagement with the stop and the steps of rotating, cutting, and so on are repeated until the tube is exhausted.

20 Claims, 3 Drawing Sheets

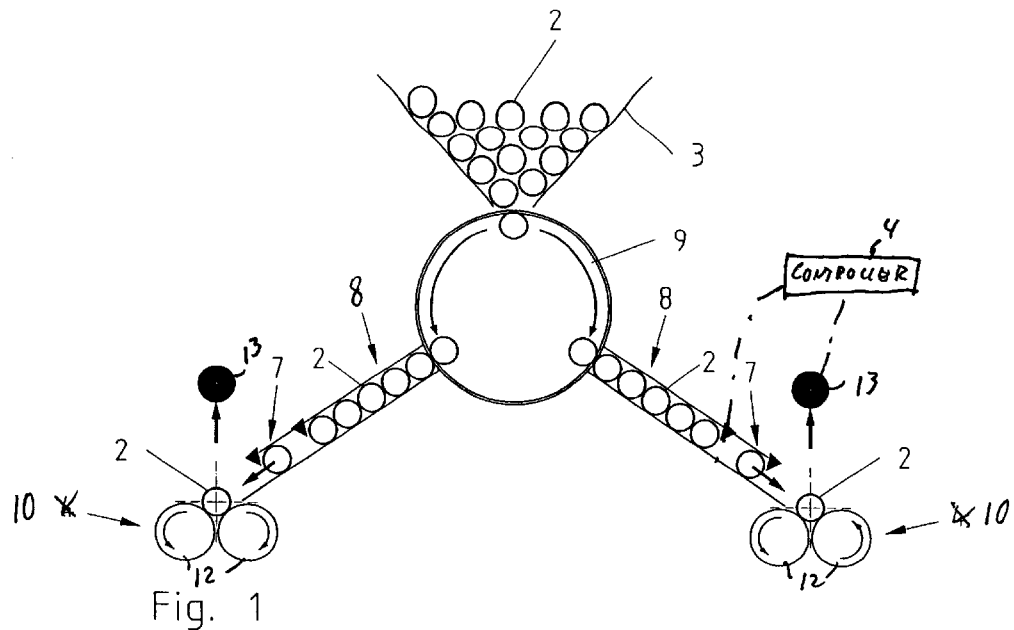
Fig. 1
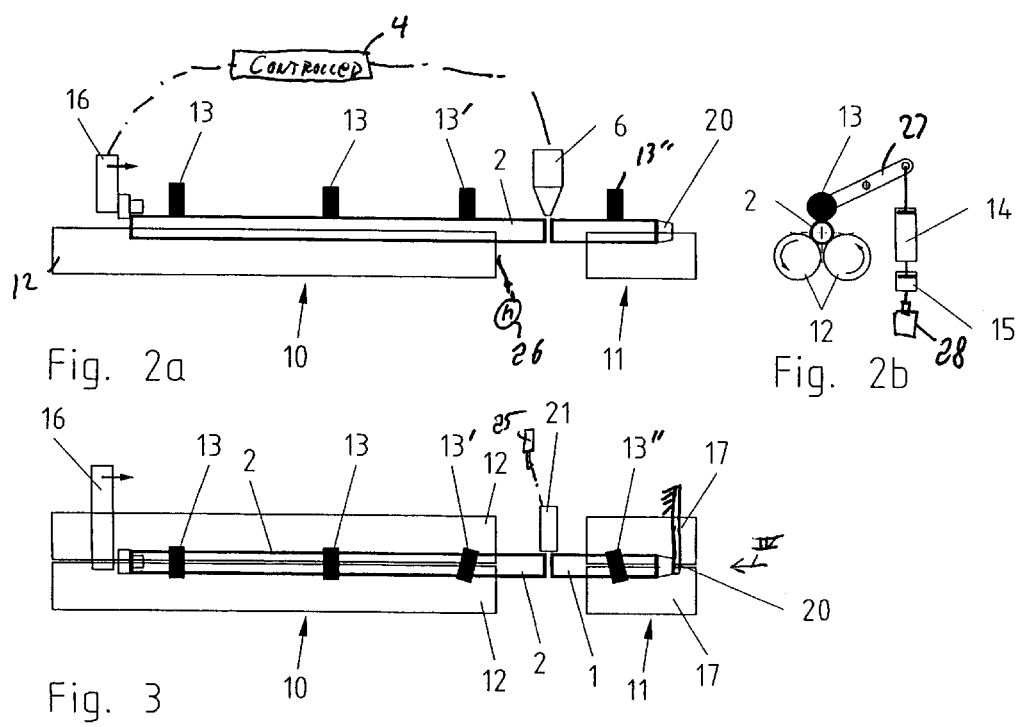
Fig. 2a
Fig. 2b
Fig. 3

SYSTEM FOR CUTTING GLASS TUBE INTO TUBE SECTIONS

FIELD OF THE INVENTION

The present invention relates to cutting a long glass tube into a plurality of identical short glass tube sections. More particularly this invention concerns a method and apparatus for thus cutting up a glass tube for use of the tube sections as syringe bodies.

BACKGROUND OF THE INVENTION

Glass is the preferred material for the manufacture of a syringe body since it can withstand the high heat of sterilization, is extremely dense and nonabsorbent, emits no chemicals as it ages, changes little in property as it ages, and is relatively cheap. Thus a syringe body normally is formed as a tube section having smoothed and finished ends.

Such a glass tube section is produced by cutting up an elongated glass tube. The tube itself can be relatively long and is supplied in bulk, often with somewhat damaged ends.

OBJECTS OF THE INVENTION

It is therefore an object of the present invention to provide an improved system for cutting such a tube up into identical finished tube sections.

Another object is the provision of such an improved system for cutting such a tube up into identical finished tube sections which overcomes the above-given disadvantages, that is which accurately and automatically cuts from the supplied tube stock a succession of tube sections usable without further treatment as syringe bodies.

SUMMARY OF THE INVENTION

This object is attained by a method of cutting a plurality of tube sections from an elongated glass tube wherein a plurality of the tubes in a supply are fed one at a time from the supply to a station. Each of the tubes is rotated in the station about a longitudinal axis of the tube in the station and is simultaneously pressed axially against a fixed stop. A laser beam is directed at the rotating tube in the station at a location along the tube offset from the stop to melt the tube at the location and cut from the tube a section lying between the location and the stop. After cutting from the tube, the tube section is transversely displaced onto a conveyor and transported away from the station by means of the conveyor. Then the tube in the station is advanced axially into engagement with the stop and the steps of rotating, cutting, and so on are repeated until the tube is exhausted.

This system therefore automatically reduces an elongated tube into a plurality of short tube sections that are usable directly as syringe bodies. The laser cutting forms an extremely neat trailing end on the tube section and leading end on the tube, and in fact the laser can normally be used after the cut is complete to thoroughly heat the cut ends and thereby ensure that they are smooth and rounded. It is relatively easy for a controller operating the various drives and actuators to accommodate tubing stock of different diameters and to cut tube sections of different lengths, all automatically.

According to the invention the tube section and tube are urged axially in opposite directions away from the location during the cutting step. This insures that the ends will not fuse back together and that the finished ends can be perfectly smoothed.

Since the leading and trailing ends of each tube are normally somewhat imperfect and in facto often fused closed, the invention proposed transversely displacing and discarding leading and trailing end sections of each of the tubes. This is done by a separate diverter flap provided at the station. The controller can easily be set to discard the first section cut after a new piece of tube stock has been loaded in, and to discard the last piece when the pusher moves into a position spaced from the stop by a distance equal to or shorter than the desired tube-section length.

The apparatus according to the invention has a supply holding a plurality of the tubes, means for feeding the tubes one at a time from the supply to a station, means for rotating each of the tubes in the station about a longitudinal axis of the tube in the station, and an axially fixed stop in the station. A pusher is provided in the station for pressing the tube axially against the fixed stop and cutter in the station directs a laser beam at the rotating tube in the station at a location along the tube offset from the stop to melt the tube at the location and cut from the tube a section lying between the location and the stop. An unloader transversely displaces the tube section after cutting from the tube onto a conveyor which transports the tube section from the station.

The feeder according to the invention includes structure for forming a single-file row of the tubes leading to the station. It also has a selector wheel for taking the tubes one at a time from the supply and feeding them to the structure. Normally such a wheel can feed two holding and cutting units that act alternately to form tube sections that are delivered to a common conveyor. The supply is a downwardly tapering hopper above the cutting station. Thus the operator of the machine need merely keep the hopper full, and the machine will automatically produce perfect tube sections one after the other.

The rotating unit includes a pair of lower cradle-forming support rollers extending along and rotatable about parallel axes parallel to the tube and adapted to hold and support the tube in the station, at least one upper hold-down roller engageable with the tube on the support rollers, and a drive that rotates at least one of the rollers and thereby rotates the tube about its axis. Each roller has an upstream portion to one axial side of the location and a downstream portion to an opposite axial side of the station. Thus the tube is fully exposed and out of touch with all support structure at the location where the cut is made.

In accordance with the invention means is provided for urging the hold-down-roller portions downward against the tube on the support rollers with a predetermined force. This means can include individually controllable normally pneumatic biasing units that can pull back rollers as the tube gets shorter so as to let the pusher pass. In addition each of the rollers has a surface with a substantially higher coefficient of friction than glass, typically a rubber coating that also protects the glass tube from breaking.

The upper roller according to the invention has two portions axially flanking the location and canted oppositely to urge the tube away from the location so that when the tube is cut through the piece and tube are urged apart at the location. Normally the downstream piece is pressed against the stop while the upstream piece is urged oppositely against the pusher that was originally used to hold the tube against the stop.

The conveyor in accordance with the invention is underneath the station and the unloader includes means for spreading the downstream portions of the lower roller and thereby dropping the tube section onto the conveyor. Furthermore the unloading unit includes guides extending downward from the lower-roller downstream portions to the conveyor. More particularly the spreader includes respective arms pivoted about an axis parallel to the tube and underneath the station. Each arm has an outer end carrying a respective one of the lower-roller down-stream portions.

The conveyor according to the invention has prismatic seats adapted to receive the tube sections and of very low heat capacity. Furthermore means is provided for aspirating vapors produced by the cutting operation from the location. A smoothing roller is pressed against the tube at the location to round ends created in the tube by the laser beam.

The pusher according to the invention includes a pusher element axially engageable with an end of the tube in the station and means for axially displacing the pusher element and thereby axially displacing the tube through the location toward the stop which is a stop roller aligned axially with the tube in the station. This stop roller is of the same diameter as the tube being cut and is normally heated to avoid excessively cooling the tube end pressed against it.

BRIEF DESCRIPTION OF THE DRAWING

The above and other objects, features, and advantages will become more readily apparent from the following description, reference being made to the accompanying drawing in which:

FIG. 1 is a partly diagrammatic end view of the apparatus according to the invention;

FIGS. 2a and 2b are partly diagrammatic side and end views of the tube-holding and -cutting devices;

FIG. 3 is a top view of the tube-holding and -cutting devices;

SPECIFIC DESCRIPTION

Figure 4:
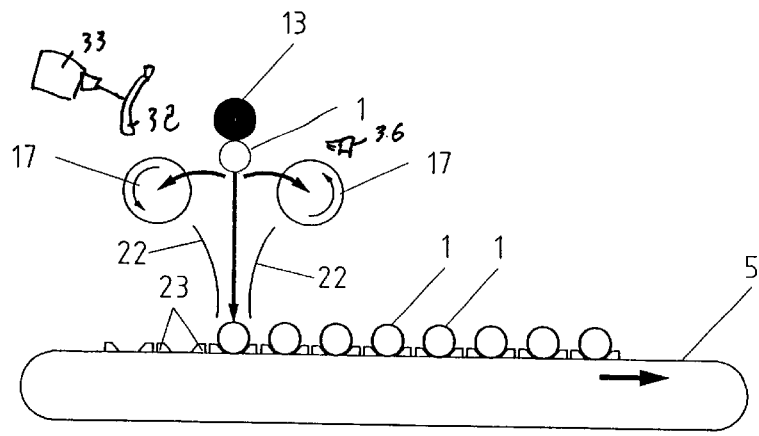
FIG. 4 is an end view taken in the direction of arrow IV of FIG. 3 and showing the outfeed conveyor and the tube-cutting device.

As seen in FIG. 1 a hopper 3 holds a supply of elongated glass tubes 2 and has a small downwardly open outlet slot from which the tubes can be passed by a feed wheel 9 to either of two feed devices 8 that form the tubes 2 into single-file rows and feed them one at a time to respective tube-holding devices 10. Gates 7 operated by a central controller 4 drop the tubes 2 out of the respective feeder chutes 8 one at a time in accordance with the needs of the downstream equipment as determined by the controller 4.

The two tube-holding devices 10 as shown in FIGS. 2a, 2b, and 3 are substantially identical. They each are comprised of two parallel rubber-covered lower rollers 12 of cylindrical shape forming a cradle into which the tubes 2 are dropped and rotated codirectionally by a motor 26 operated by the controller 4. Immediately downstream of each holding device 10 is a cutting device 11 having a pair of rollers 17 coaxial with the rollers 11 and identical thereto, except much shorter. Rubber hold-down wheels 13 and 13' hold the tube 2 down in solid contact with the rollers 12 and 17. These rollers 13 and 13' are carried on the outer ends of arms 27 whose inner ends are connected via respective pneumatic biasing units 14 to a common beam 15 that can be raised and lowered by a single actuator 28 operated by the controller 4. This actuator 28 can press the rollers 13 and 13' against the tube 2 sitting on the rollers 12 and 17 with a force determined by the pressure in the units 14 while the controller 4 holds back rollers 13 at the upstream end that are not needed as the tube 2 is made shorter. The rollers 13 are rotatable about axes parallel to the axes of the rollers 12 and 17, but the rollers 13' are rotatable about axes slightly skew to these axes so as to urge the downstream (right-hand in the drawing) portion of the tube 2 downstream and the upstream portion upstream as will be described in more detail below.

Between the two sets of rollers 12 and 11 is a laser cutter 6 that can be operated by the controller 4 to cut a section 1 from the downstream end of the tube 2. In addition the holding device 10 is provided with a pusher 16 operated by the controller 4 and serving to push a downstream end of the tube 2 against an axially fixed stop roller 20 provided between the rollers 17.

Figure 5A:
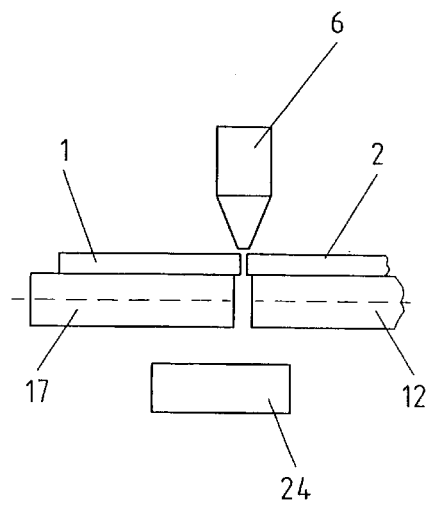
FIGS. 5a and 5b are side views illustrating a portion of the tube-holding and -cutting devices during and after cutting.
Figure 5B:
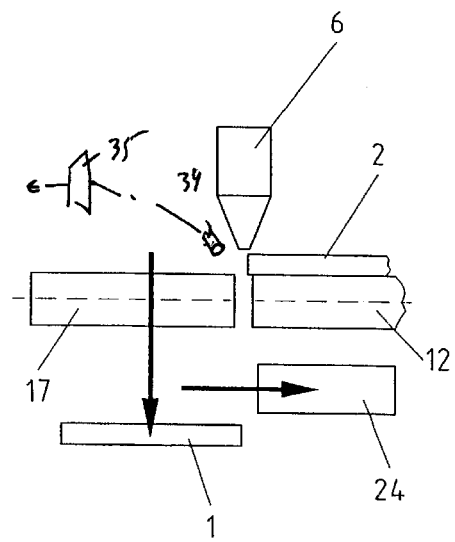
Figure 6:
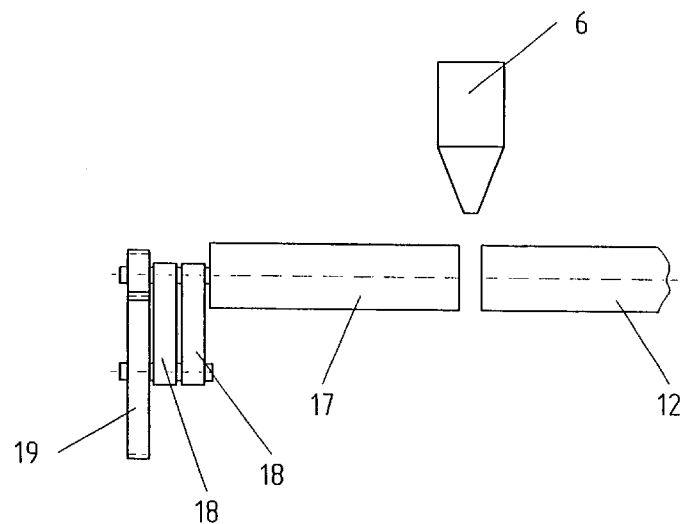
FIG. 6 is a side view illustrating part of the tube-holding and -cutting devices.
Figures 7A, 7B:
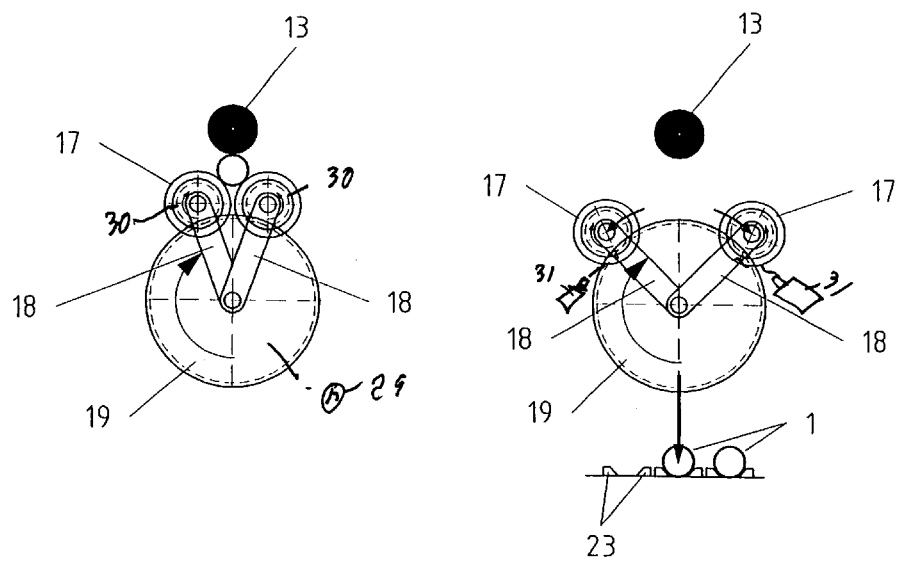
FIGS. 7a and 7b are partly diagrammatic end views showing the tube-cutting device in holding and releasing positions.

As shown in FIGS. 4, 6, 7a, and 7b, the rollers 17 are carried on the outer ends of arms 18 pivoted on the axis of a drive gear 19 rotated by a motor 29 and meshing with gears 30 fixed to the ends of the rollers 17. Thus these rollers 17 will be rotated in the same direction. A similar system can be connected between the motor 26 and the rollers 12. Furthermore actuators shown schematically at 31 and operated by the controller 4 can pivot these rollers 17 apart as shown in FIGS. 4 and 7b to allow a tube section 1 between them to drop down between guide plates 22 to seats 23 on an outfeed conveyor 5. FIGS. 5a and 5b show a shield 24 that is positioned by the controller 4 underneath the laser cutter 6 during the cutting operation and moved out of the way when the rollers 17 are spread to drop a tube section 10 onto the outfeed conveyor 5.

Thus with this system the operator need merely see that a sufficient supply of glass tubes 2 is held in the supply hopper 3. The machine will feed these tubes 2 to the holding devices 10 where the pushers 16 will each press a leading end of the fresh tube 2 against the stop 20. The hold-down rollers 13 and 13' are then lowered into place and the tube 2 is set to rotating by the drive motors 26 and 29, then the shield 24 is put in place and laser 6 is energized to cut the leading end off the tube 2. After the cut is complete, the laser 6 can continue to heat the two ends to form a smooth end bead. In addition, as soon the cut is made a smoothing tool or roller 21 (FIG. 3) is urged by an actuator 25 against the hot ends of the workpiece 2 and cut-off section 1 to further smooth and round them. Normally glass sublimate is aspirated through a tube 34 and a blower 35 at the cut site and an electric-eye sensor 36 (FIG. 4) connected to the controller 4 is used to ensure that the cut is complete.

Thereafter the rollers 17 are spread by the actuators 31 and the piece 1 drops down through the chute 22. The end pieces 1 from the tube 2 are normally diverted to the side by a flipper 32 operated through the controller 4 by an actuator 33 since the ends of the leading and trailing pieces are not normally neat enough for syringe use. The good pieces 1 are carried off in the seats 23 of the conveyor 5 to a further processing stage. These seats are made to have a minimal heat capacity so the pieces 2 can cool uniformly.

What is claimed is:

1. An apparatus for cutting a plurality of tube sections from an elongated glass tube, the apparatus comprising:
   a supply holding a plurality of the tubes;
   means for feeding the tubes one at a time from the supply to a station;
   means for rotating each of the tubes in the station about a longitudinal axis of the tube in the station;

an axially fixed stop in the station;

pusher means in the station for pressing the tube axially against the fixed stop;

cutting means in the station for directing a laser beam at the rotating tube in the station at a location along the tube offset from the stop to melt the tube at the location and cut from the tube a section lying between the location and the stop;

means for aspirating vapors produced by the cutting operation from the location;

a conveyor adjacent the station; and unloading means for transversely displacing the tube section after cutting from the tube onto the conveyor and transporting the tube section from the station by means of the conveyor.

2. The tube-cutting apparatus defined in claim 1 wherein the feeding means includes structure for forming a single-file row of the tubes leading to the station.

3. The tube-cutting apparatus defined in claim 2 wherein the feeding means includes a selector wheel for taking the tubes one at a time from the supply and feeding them to the structure.

4. The tube-cutting apparatus defined in claim 1 wherein the supply is a downwardly tapering hopper.

5. The tube-cutting apparatus defined in claim 1 wherein the rotating means includes:

a pair of lower cradle-forming support rollers extending along and rotatable about parallel axes parallel to the tube and adapted to hold and support the tube in the station;

at least one upper hold-down roller engageable with the tube on the support rollers; and means for rotating at least one of the rollers and thereby rotating the tube about its axis.

6. The tube-cutting apparatus defined in claim 5 wherein each roller has an upstream portion to one axial side of the location and a downstream portion to an opposite axial side of the station.

7. The tube-cutting apparatus defined in claim 6, further comprising means for urging the hold-down-roller portions downward against the tube on the support rollers with a predetermined force.

8. The tube-cutting apparatus defined in claim 7 wherein each of the rollers has a surface with a substantially higher coefficient of friction than glass.

9. The tube-cutting apparatus defined in claim 8 wherein the upper roller has two portions axially flanking the location and canted oppositely to urge the tube away from the location, whereby when the tube is cut through the piece and tube are urged apart at the location.

10. The tube-cutting apparatus defined in claim 6 wherein the conveyor is underneath the station and the unloading means includes means for spreading the downstream portions of the lower roller and thereby dropping the tube section onto the conveyor.

11. The tube-cutting apparatus defined in claim 10 wherein the unloading means further includes guides extending downward from the lower-roller downstream portions to the conveyor.

12. The tube-cutting apparatus defined in claim 10 wherein the spreading means includes respective arms pivoted about an axis parallel to the tube and underneath the station, each arm having an outer end carrying a respective one of the lower-roller downstream portions.

13. The tube-cutting apparatus defined in claim 1 wherein the conveyor has seats adapted to receive the tube sections and of very low heat capacity.

14. The tube-cutting apparatus defined in claim 1 further comprising a smoothing roller and means for pressing the smoothing roller against the tube at the location and thereby rounding ends created in the tube by the laser beam.

15. The tube-cutting apparatus defined in claim 1 wherein the pusher means includes a pusher element axially engageable with an end of the tube in the station; and means for axially displacing the pusher element and thereby axially displacing the tube through the location toward the stop.

16. An apparatus for cutting a plurality of tube sections from an elongated glass tube, the apparatus comprising:

a supply holding a plurality of the tubes;

means for feeding the tubes one at a time from the supply to a station;

means for rotating each of the tubes in the station about a longitudinal axis of the tube in the station;

an axially fixed stop roller in the station aligned axially with the tube in the station;

pusher means in the station for pressing the tube axially against the fixed stop;

cutting means in the station for directing a laser beam at the rotating tube in the station at a location along the tube offset from the stop to melt the tube at the location and cut from the tube a section lying between the location and the stop;

a conveyor adjacent the station; and unloading means for transversely displacing the tube section after cutting from the tube onto the conveyor and transporting the tube section from the station by means of the conveyor.

17. The tube-cutting apparatus defined in claim 16 wherein the feeding means includes structure for forming a single-file row of the tubes leading to the station.

18. The tube-cutting apparatus defined in claim 17 wherein the feeding means includes a selector wheel for taking the tubes one at a time from the supply and feeding them to the structure.

19. The tube-cutting apparatus defined in claim 16 wherein the supply is a downwardly tapering hopper.

20. The tube-cutting apparatus defined in claim 16 wherein the rotating means includes:

a pair of lower cradle-forming support rollers extending along and rotatable about parallel axes parallel to the tube and adapted to hold and support the tube in the station;

at least one upper hold-down roller engageable with the tube on the support rollers; and means for rotating at least one of the rollers and thereby rotating the tube about its axis.

* * * * *